United States Patent
Ito

(10) Patent No.: US 8,391,620 B2
(45) Date of Patent: Mar. 5, 2013

(54) IMAGE PROCESSING APPARATUS, IMAGE FORMING APPARATUS AND IMAGE PROCESSING METHOD

(75) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1077 days.

(21) Appl. No.: 11/866,070

(22) Filed: Oct. 2, 2007

(65) Prior Publication Data
US 2008/0181514 A1 Jul. 31, 2008

(30) Foreign Application Priority Data
Oct. 3, 2006 (JP) ................................ 2006-272319

(51) Int. Cl.
*G06K 9/36* (2006.01)
(52) U.S. Cl. ..................................................... 382/232
(58) Field of Classification Search .................... None
See application file for complete search history.

(56) References Cited

U.S. PATENT DOCUMENTS

| | | | |
|---|---|---|---|
| 5,572,206 A * | 11/1996 | Miller et al. ..................... 341/51 |
| 5,635,932 A * | 6/1997 | Shinagawa et al. .............. 341/51 |
| 5,646,617 A * | 7/1997 | Ohmoto et al. .................. 341/51 |
| 6,792,157 B1 * | 9/2004 | Koshi et al. ..................... 382/251 |
| 6,865,291 B1 * | 3/2005 | Zador ............................. 382/166 |
| 2006/0114528 A1 * | 6/2006 | Ito ................................. 358/525 |
| 2007/0046681 A1 * | 3/2007 | Nagashima .................... 345/536 |
| 2007/0047035 A1 | 3/2007 | Ito |

FOREIGN PATENT DOCUMENTS

| | | |
|---|---|---|
| JP | 2001-339617 A | 12/2001 |
| JP | 2002-135128 A | 5/2002 |
| JP | 2004-274131 | 9/2004 |
| JP | 2005-217954 A | 8/2005 |
| JP | 2006-173747 A | 6/2006 |

* cited by examiner

*Primary Examiner* — Samir Ahmed
(74) *Attorney, Agent, or Firm* — Carter, DeLuca, Farrell & Schmidt LLP

(57) ABSTRACT

An image processing apparatus divides an input image data string into a first data string and a second data string, and generates a sliding dictionary and a code value, which indicates correspondence between the first data string and the sliding dictionary, from the first data string. The image processing apparatus converts data that has been registered in the sliding dictionary and interpolates the data, which has been obtained by the conversion, at a weighting conforming to the second data string in accordance with a code value.

15 Claims, 9 Drawing Sheets

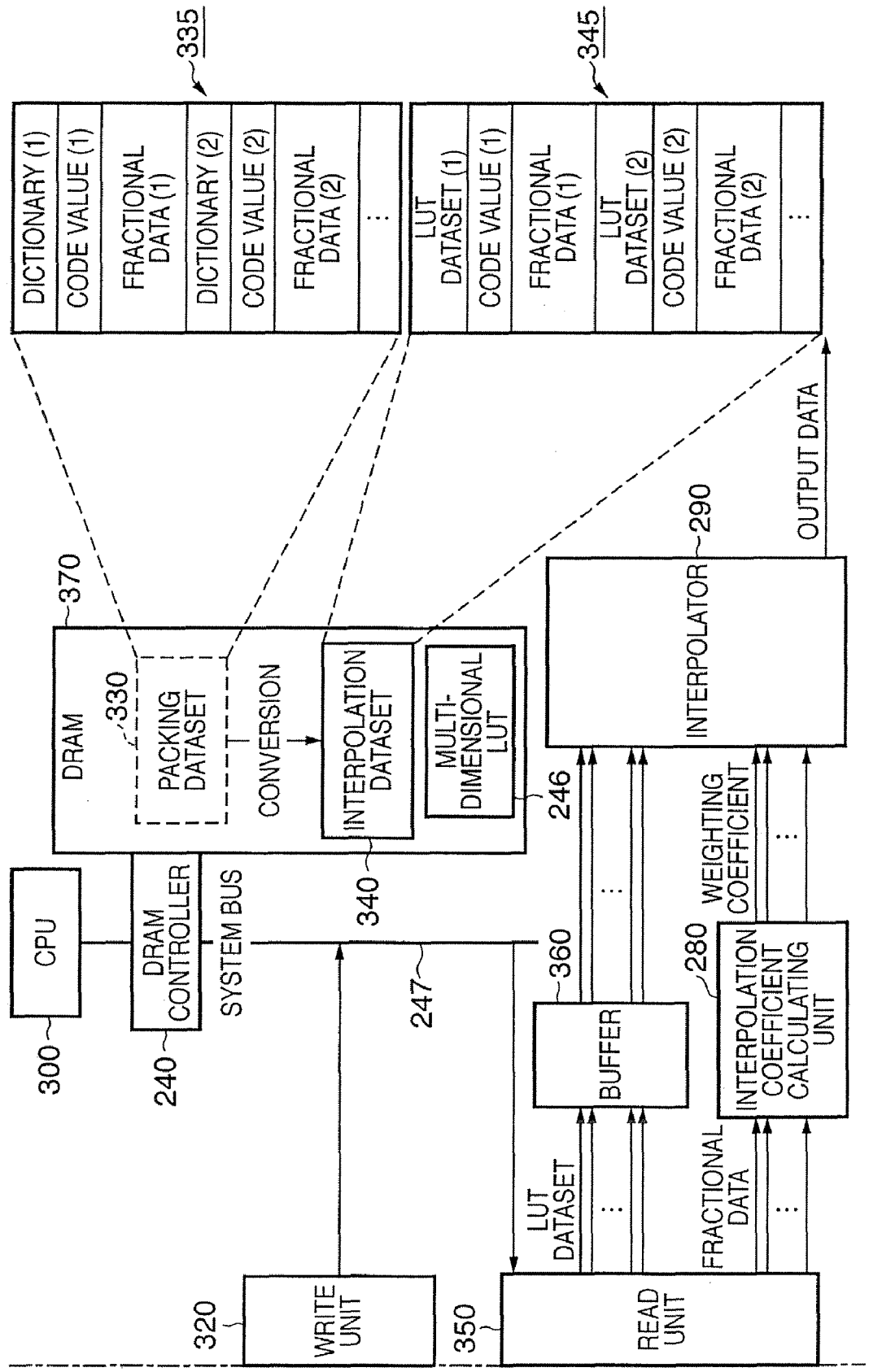

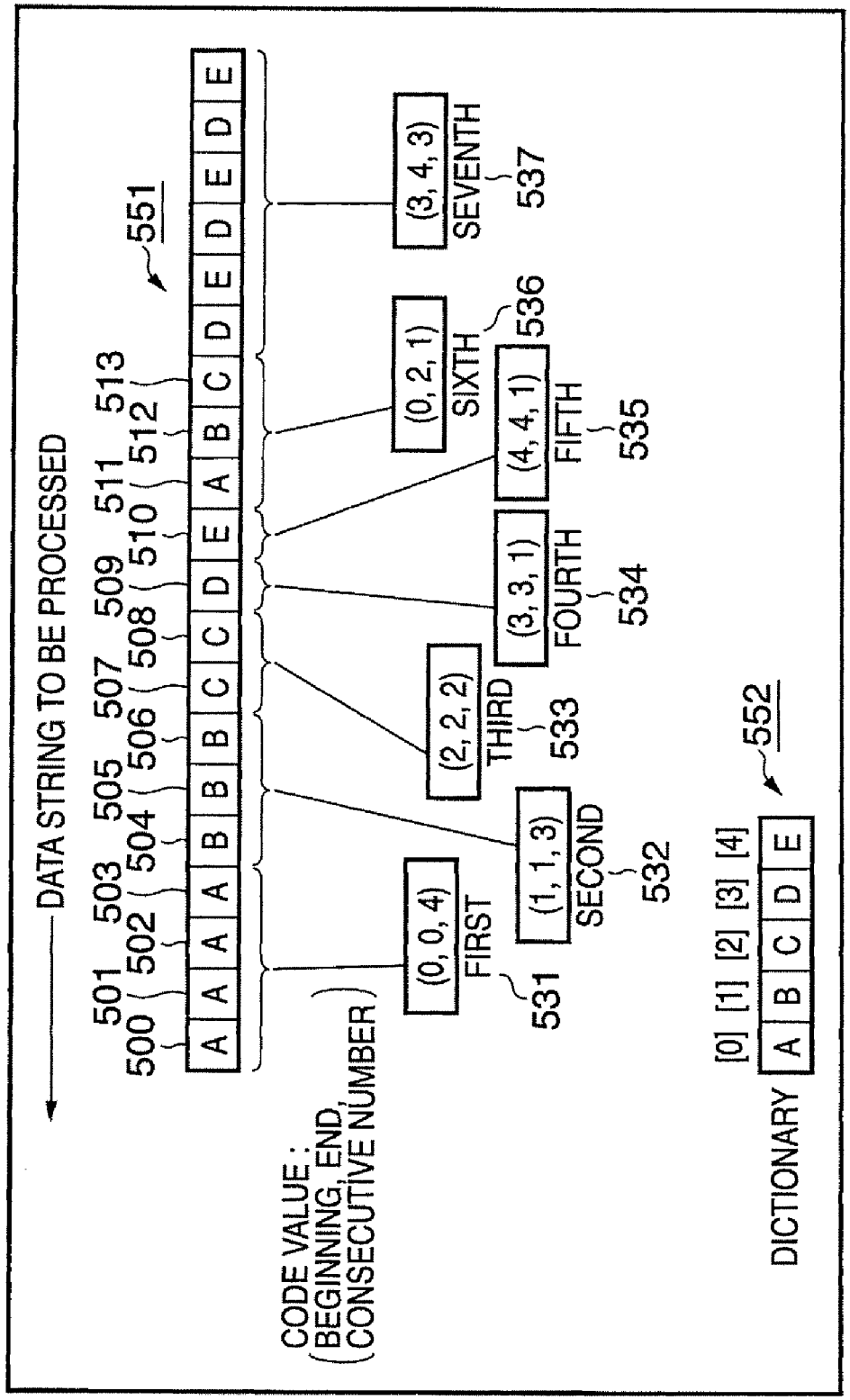

IMAGE PROCESSING APPARATUS, IMAGE FORMING APPARATUS AND IMAGE PROCESSING METHOD

BACKGROUND OF THE INVENTION

1. Field of the Invention

The present invention relates to an image processing apparatus, an image forming apparatus and an image processing method.

2. Description of the Related Art

Devices such as scanners and video cameras have become widely available as input devices in recent years. On the other hand, various color printers using inkjet, dye-sublimation and electrophotographic methods have become widespread as output devices. These color input and output devices have their own color spaces. For example, in a case where a color image obtained by a certain scanner is printed as is upon being transferred to a separate color printer, the colors in the printed color image will differ from the colors in the original color image read by the scanner owing to the difference in the color spaces.

In order to solve this problem of color reproducibility of color images between devices, processing (referred to as "color-space conversion processing" below) for converting the color space of the input device to the color space of the output device is required. In order to improve color reproducibility between input and output devices, there are instances where the input and output devices are equipped with an image processing circuit having a color-space conversion function.

For example, the specification of Japanese Patent Application Laid-Open No. 2004-274131 proposes a color conversion apparatus in which an image processing circuit having a color-space conversion function is provided with a cache mechanism, and a three-dimensional look-up table (3D-LUT) that stores reference values necessary for color-space conversion is stored in an external memory such as a DRAM.

According to Japanese Patent Application Laid-Open No. 2004-274131, color space used in an interpolation operation is modeled as a unit cube, a small-capacity internal SRAM is assigned to each vertex of the unit cube, and the internal SRAM is used as a cache memory.

With an ordinary direct-mapping-type cache mechanism, the storage destination of the cache memory is decided by the lower-order bits of a color-space address. Consequently, there are instances where storage destinations contend between successive items of image data and the cache mechanism does not function effectively. In other words, when items of image data for which the lower-order bits of the addresses are the same but the higher-order bits are different continue to be input alternatingly, the cache memory is overwritten alternatingly and mishits occur.

When a direct-mapping cache mechanism experiences a mishit, only data necessary when interpolation is executed is read out of the external memory (DRAM) having the 3D-LUT, the cache memory is updated and the interpolation is executed. By providing the image processing circuit for color-space conversion with the cache mechanism, it is possible to reduce the capacity of the internal SRAM.

However, in a case where image processing is executed by the image processing circuit equipped with the cache mechanism, a problem which arises is a decline in processing capability when the cache mechanism experiences a mishit. The image processing circuit ceases operating and image processing can no longer be executed until the mishit in the cache mechanism is discriminated, the desired data is read out of the external memory such as the DRAM and the cache memory is updated.

Waiting time for this updating of data is referred to as "refill latency". The longer refill latency is, the more processing capability declines when a mishit occurs in the cache mechanism. A common solution that can be mentioned is to suppress the decline in processing capability by increasing the capacity of the cache memory and reducing the frequency of mishits.

However, the frequency of mishits depends upon statistical bias of the input image data to the image processing circuit and merely increasing the capacity of the cache memory is not a satisfactory solution. Further, a solution that calls for a great increase in the capacity of the cache memory runs counter to a reduction in LSI manufacturing cost, which was the original reason for providing the cache memory.

Besides considering techniques for reducing the frequency of mishits in the cache, minimization of refill latency when mishit has occurred and a reduction in the degree of the decline in mishit processing capability are sought.

Constructing an image processing system having little refill latency leads to construction of a stable image processing system that is independent of statistical bias of input image data. However, such a method of reducing refill latency is not disclosed in Japanese Patent Application Laid-Open No. 2004-274131.

Further, in an image processing apparatus such as a printer, there has been a tendency in recent years to raise the resolution of image processing greatly in order to improve image quality. A solution to raising the resolution of image processing is to raise the operating frequency of the LSI chip. However, in the case of consumer-product-oriented LSI chips, various problems such as power consumption arise, and there are also cases in which the solution that entails raising LSI operating frequency cannot be reflected. In such cases, consideration has been given to improving processing capability per unit operating frequency by placing image processing circuits in parallel and processing a plurality of pixels in parallel.

However, with image processing in which a 3D-LUT is referred to randomly per series of pixels to be processed, as in a color-space conversion, implementing the parallel processing of a plurality of pixels is difficult as long as the same 3D-LUT is not provided in duplicate for every image processing circuit placed in parallel.

SUMMARY OF THE INVENTION

The present invention seeks to shorten data-update waiting time (refill latency).

The present invention provides an image processing apparatus comprising: a dividing unit adapted to divide an input image data string into a first data string and a second data string; a generating unit adapted to generate a sliding dictionary and a code value, which indicates correspondence between the first data string and the sliding dictionary, from the first data string; a converting unit adapted to convert data that has been registered in the sliding dictionary; and an interpolating unit adapted to interpolate data, which has been obtained as a result of the conversion by the converting unit, at a weighting conforming to the second data string in accordance with the code value.

The present invention provides an image processing method comprising the steps of: dividing an input image data string into a first data string and a second data string; generating a sliding dictionary and a code value, which indicates correspondence between the first data string and the sliding dictionary, from the first data string; converting data that has been registered in the sliding dictionary; and interpolating data, which has been obtained as a result of the conversion at the converting step, at a weighting conforming to the second data string in accordance with the code value.

Further features of the present invention will become apparent from the following description of exemplary embodiments with reference to the attached drawings.

BRIEF DESCRIPTION OF THE DRAWINGS

FIGS. 3A and 3B are diagrams illustrating the circuit configuration of an interpolating unit according to a second embodiment;

FIG. 5 is a diagram useful in describing a sliding dictionary with a consecutive number.

DESCRIPTION OF THE EMBODIMENTS

Preferred embodiments of the present invention will now be described in detail with reference to the drawings. It should be noted that the structural elements described in these embodiments are for illustrative purposes only and that the scope of the invention is not limited to these embodiments.

The implementations described in first to third embodiments are ideal for interpolation processing of input image data in a color-space conversion for converting the color space of an input device to the color space of an output device in image processing. The present invention is not limited to color-space conversion and can also be applied to image processing using a memory in which reference values have been stored.

(First Embodiment)

Figure 1:
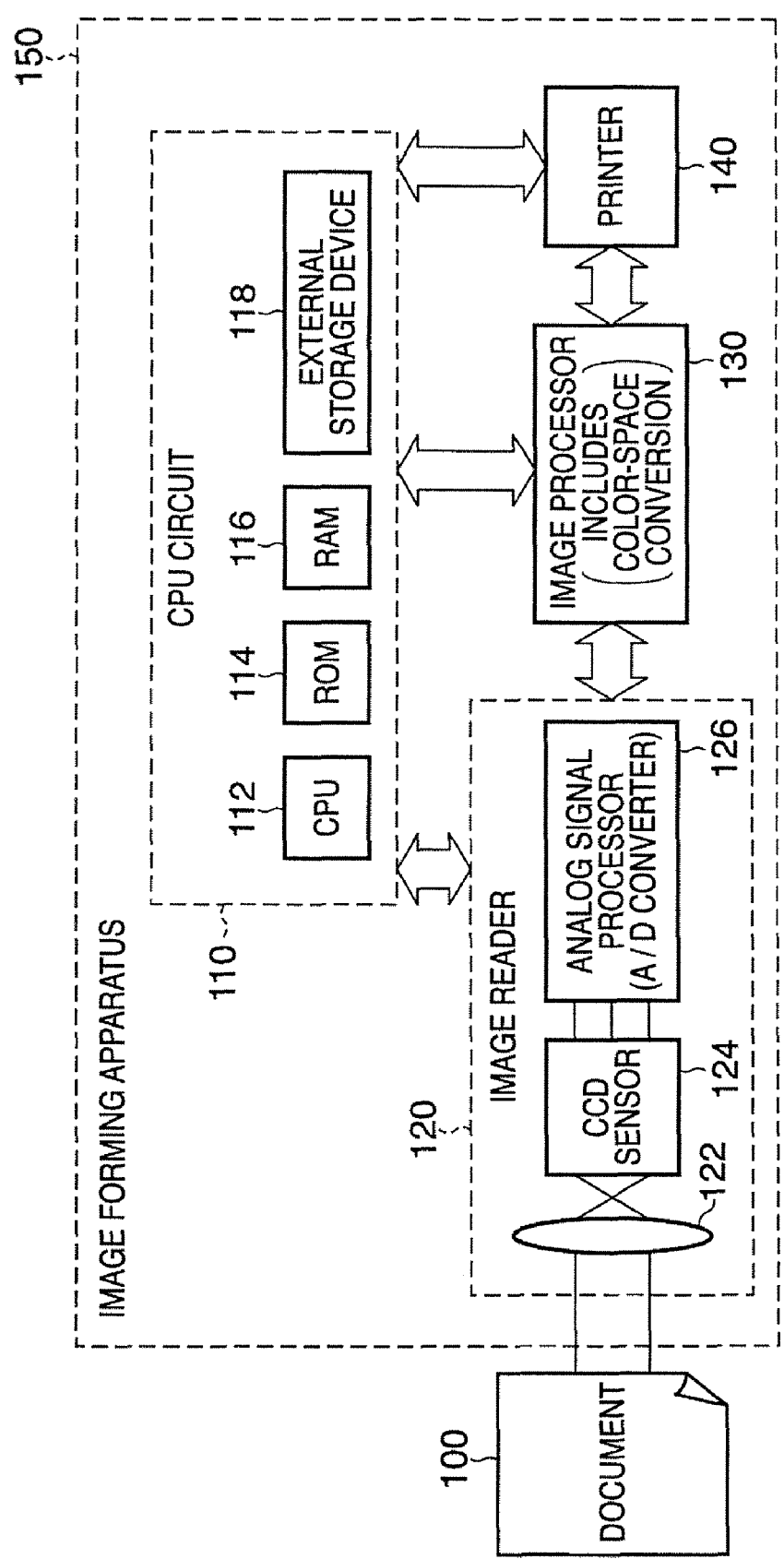
FIG. 1 is a diagram illustrating an example of the configuration of a color copier as an image forming apparatus.

FIG. 1 is a diagram illustrating an example of the configuration of a color copier serving as an image forming apparatus 150 according to this embodiment of the present invention. The present invention is not limited to a color copier. An image reader 120 comprises a lens 122, a CCD sensor 124 and an analog signal processor 126. The image of a document 100 formed on the CCD sensor 124 via the Lens 122 is converted to R, G, B analog electric signals by the CCD sensor 124. The image information contained in the analog electric signals obtained by the conversion is input to the analog signal processor 126 and is subjected to an analog-to-digital (A/D) conversion upon undergoing a correction for each of the colors R, G, B.

A digitized full-color signal (referred to as a "digital image signal" below) is input to an image processor 130. The image processor 130 subjects the digital image signal to an input gamma correction, color-space conversion, density correction and screen processing and outputs the processed digital image signal to a printer 140.

An interpolating unit used in the color-space conversion described in this embodiment implements the color-space conversion, which is carried out by the image processor 130.

The printer 140 comprises an exposure controller (not shown) for controlling irradiation with a laser or the like, an image forming unit, and a transport controller (not shown) for controlling the transport of a recording medium (referred to as a "sheet" below). The printer 140 records an image on the sheet by the input digital image signal.

A CPU circuit 110 comprises a CPU 112 for calculation control, a ROM 114 for storing fixed data and programs, a RAM 116 used for storing data temporarily and for loading programs, and an external storage device 118, etc. The external storage device 118 is a storage medium such as a hard disk for storing parameters and programs used by the image forming apparatus 150. It can also be so arranged that the data and programs, etc., in the RAM 116 are loaded from the external storage device 118. The CPU circuit 110 controls the image reader 120, image processor 130 and printer 140 and exercises overall control of the sequence of the image forming apparatus 150. It should be noted that the present invention is not limited to an apparatus in which the image reader 120 serving as the image input unit and the printer 140 serving as the image output unit are integrated into a single apparatus, and it may be so arranged that the image reader 120 serving as the image input unit and the printer 140 serving as the image output unit are made separate from each other. Further, the image input unit is not limited to the image reactor 120 that reads the document 100 using the CCD sensor 124; the method of generating the digital image signal does not matter. The image output unit is not limited to the printer 140 and may be a display unit.

(Interpolation Processing Using Sliding-Dictionary with Consecutive Number)

On the assumption that interpolation processing is interpolation processing using the sliding-dictionary method with consecutive numbers, LZ77 encoding, which is a common sliding-dictionary method, will be described. With LZ77 encoding (the sliding-dictionary method), a character-string pattern is extracted from an input character string that has undergone compression, and a character-string pattern (maximum-length matching pattern) that matches this pattern is detected within the input character string preceding this pattern. The maximum-length matching pattern is replaced by the position and length of the maximum-length matching pattern in the input character string. For example, if we assume that "ABCD'ABC'EFG . . . " is the input character string, then "ABC" is the maximum-length matching pattern in the previous data. The matching character string "ABC" (the maximum-length matching pattern) is replaced by the position four characters backward from the beginning of "ABC" and the pattern (length) of three matching characters.

In relation to LZ77 encoding, see Haruhiko Okumura et al., "New Algorithm Dictionary based upon Software Technology 13 C Language" (Dec. 10, 1991, published by Gijutsu Hyoronsha), pp. 389-393. Further, see "Principles of Compression Algorithm Encoding and Mounting by C Language" (Nov. 25, 2003, published by Softbank Publishing K.K.), pp. 125-131.

With LZ77 encoding (sliding-dictionary method), attention is directed to the pattern property of a character string (data string) that has appeared in the past, and a dictionary is constructed based upon this pattern. It is determined whether a data string identical with the replaced data string exists in the dictionary. If an identical data string exists in the dictionary, the replaced data string is expressed as a code value indicating the position in the dictionary and the length of the matching data string.

In a case where the length of the matching data string is sufficiently long, the code value has a smaller amount of information than the replaced data string. By virtue of this operating principle, the amount of information in the input data string is compressed by LZ77 encoding. With LZ77 encoding, the size of the dictionary is made a fixed length. In a case where the dictionary becomes full, a number of items of data identical with the number of items of data registered in the dictionary are erased from the dictionary, the remaining data is subjected to slide processing in the dictionary and data desired to be registered anew is added on to the tail end. Owing to the use of such slide processing, LZ encoding is referred to as the sliding-dictionary method.

The sliding-dictionary method is suited to compression of characters and the like. However, if the same data continues, then the same data will be registered in the dictionary, the variety of the data registered in the dictionary will be lost and compression efficiency will decline. Consequently, there are cases where data compression by LZ77 encoding exhibits poor efficiency when applied to image data in which there are many instances of continuous identical data locally.

On the other hand, run-length compression is available as a method of compressing image data. With run-length compression, continuous data is made a code value using the value of the data and the number of continuous pixels. The larger the number of continuous pixels, therefore, the higher the compression rate of the image data by the run-length compression method. However, if the image data changes periodically and the same image data does not continue, the compression rate of the image data declines.

The present invention is applicable to an interpolating unit in the image processor 130 in which a dictionary is created using the run-length compression method or LZ77 encoding (the sliding-dictionary method) and color conversion processing is executed with respect to the dictionary data. Here, however, the present invention is applied to an interpolating unit in the image processor 130 that creates a sliding dictionary with a consecutive number making joint use of LZ77 and the run-length compression method, and executes color conversion processing with respect to the dictionary data.

A sliding dictionary with a consecutive number according to this embodiment will be described next. FIG. 5 is a diagram useful in describing a sliding dictionary with a consecutive number according to this embodiment. Assume that a data string 551 to be processed is input in the following order: "A", "A", "A", "A", "B", "B", "B", "C", "C", "D", "E", "A", "B", "C" . . . .

In FIG. 5, a sliding dictionary with a consecutive number (referred to simply as a "sliding dictionary" below) 552 has entry areas ([0] to [4]) that store the initially appearing data (characters) detected from the data string 551.

Code values in FIG. 5 represent information associating data (characters) contained in the data string 551 to be processed and the sliding dictionary 552. The information in each code value has "beginning", "end" and "consecutive number" data. Data indicating in which entry area an item of data (a character) has been stored in the sliding dictionary 552 is stored in "beginning" and "end". The number of iterations of an item of data (a character) from "beginning" to "end" is stored in "consecutive number".

When the data string 551 to be processed is input, the CPU 112 detects the initially appearing data (character) in data string 551 that has not been written to the sliding dictionary 552 and writes this data successively to the entry areas ([0] to [4]) of the sliding dictionary 552. Since "A" 500, which is at the very beginning of the data string 551, does not yet exist in an entry area of the sliding dictionary 552, the CPU 112 writes "A" to entry area [0] of the sliding dictionary 552. Here "0", which indicates that the corresponding data (character) "A" has been written to entry area [0] of the sliding dictionary 552, is stored as the "beginning" data of a code value 531.

Next, the CPU 112 discriminates whether a succeeding item of data (character) "A" 501 and the item of data (character) "A" 500 just processed are identical or not.

If the items of data (characters) are identical, this means that the data (character) "A" has already been written to entry area [0] of the sliding dictionary 552. Therefore, the CPU 112 increments the "consecutive number" data of the code value 531 without writing the identical data (character) "A" 501.

Next, the CPU 112 similarly discriminates whether succeeding items of data (characters) "A" 502 and "A" 503 are identical with the data (character) processed immediately previously. If the result of discrimination is that they are identical, the CPU 112 counts up the dictionary 552. Therefore, the CPU 112 successively increments the "consecutive number" data of the code value 531.

Next, the CPU 112 discriminates whether a succeeding item of data (character) "B" 504 and the data (character) "A" 503 are identical or not and writes the initially appearing data (character) "B" 504 to entry area [1] of the sliding dictionary 552. Owing to the data (character) "B" 504, the continuity of the items of data (characters) "A" is interrupted. Here "0", which indicates that the corresponding data (character) "A" has been written to entry area [0] of the sliding dictionary 552, is stored as the "end" data of a code value 531. Data "4" is stored as the consecutive number in the code value 531.

Next, the CPU 112 similarly discriminates whether items of data (characters) "B" 505 and "B" 506 are identical with the data (character) processed immediately previously, and data corresponding to "end" and "consecutive number" is stored based upon the results of discrimination.

By applying the foregoing processing to the entire data string 551 that has been input, the initially appearing items of data (characters) are written to the entry areas of the sliding dictionary 552. Data associating the data (characters) contained in the data string 551 to be processed and the sliding dictionary 552 is written to the code value.

Data (character) "C" has been written to entry area [2] of the sliding dictionary 552, data (character) "D" has been written to entry area [3], and data (character) "E" has been written to entry area [4].

The code area 531 indicates that the "beginning" data (character) has been stored in entry area [0] of the sliding dictionary, and that the "end" data (character) has been stored in entry area [0] of the sliding dictionary. "Consecutive number" indicates that the number of iterations of data (character) "A" from "beginning" to "end" is "4".

A code area 532 indicates that the "beginning" data (character) has been stored in entry area [1] of the sliding dictionary, and that the "end" data (character) has been stored in entry area [1] of the sliding dictionary. "Consecutive number" indicates that the number of iterations of data (character) "B" from "beginning" to "end" is "3".

A code area 533 indicates that the "beginning" and "end" data (character) has been stored in entry area [1] of the sliding dictionary, and "consecutive number" indicates that the number of iterations of data (character) "C" is "2".

A code area 534 indicates that the "beginning" and "end" data (character) has been stored in entry area [3] of the sliding dictionary, and "consecutive number" indicates that the number of iterations of data (character) "D" is "1".

A code area 535 indicates that the "beginning" and "end" data (character) has been stored in entry area [4] of the sliding dictionary, and "consecutive number" indicates that the number of iterations of data (character) "E" is "1".

A code area 535 indicates that the "beginning" data (character) has been stored in entry area [0] of the sliding dictionary 552, and that the "end" data (character) has been stored in entry area [2] of the sliding dictionary. "Consecutive number" indicates that the number of iterations of data (characters) "ABC" from "beginning" to "end" is "1".

A code area 537 indicates that the "beginning" data (character) has been stored in entry area [3] of the sliding dictionary, and that the "end" data (character) has been stored in entry area [4] of the sliding dictionary. "Consecutive number" indicates that the number of iterations of data (characters) "DE" from "beginning" to "end" is "3".

The CPU 112 outputs the sliding dictionary 552 and code values (531 to 537) by repeating the foregoing processing.

The interpolating unit according to this embodiment uses the sliding dictionary in the encoding of integral data among multidimensional (N-dimensional) digital image data. Digital image data often has identical data values in local areas, and integral data, moreover, are the higher-order bits of the digital image data. The integral data, therefore, has all the more tendency to consist of identical data values that are consecutive. This means that using the sliding dictionary with a consecutive number to encode integral data is efficacious.

(Description of Interpolating Unit)

Figure 2A:
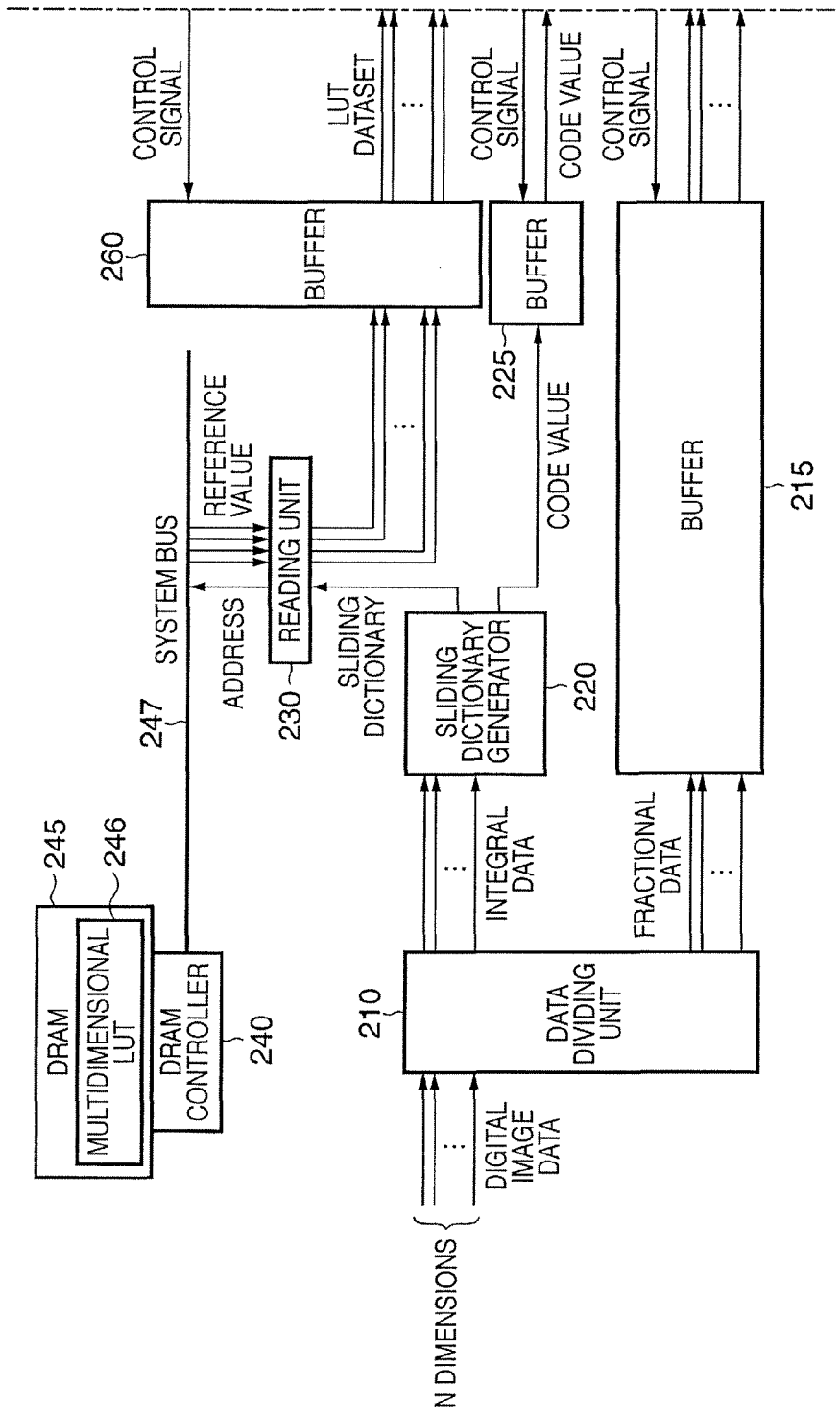
FIGS. 2A and 2B are diagrams illustrating the circuit configuration of an interpolating unit according to a first embodiment.
Figure 2B:
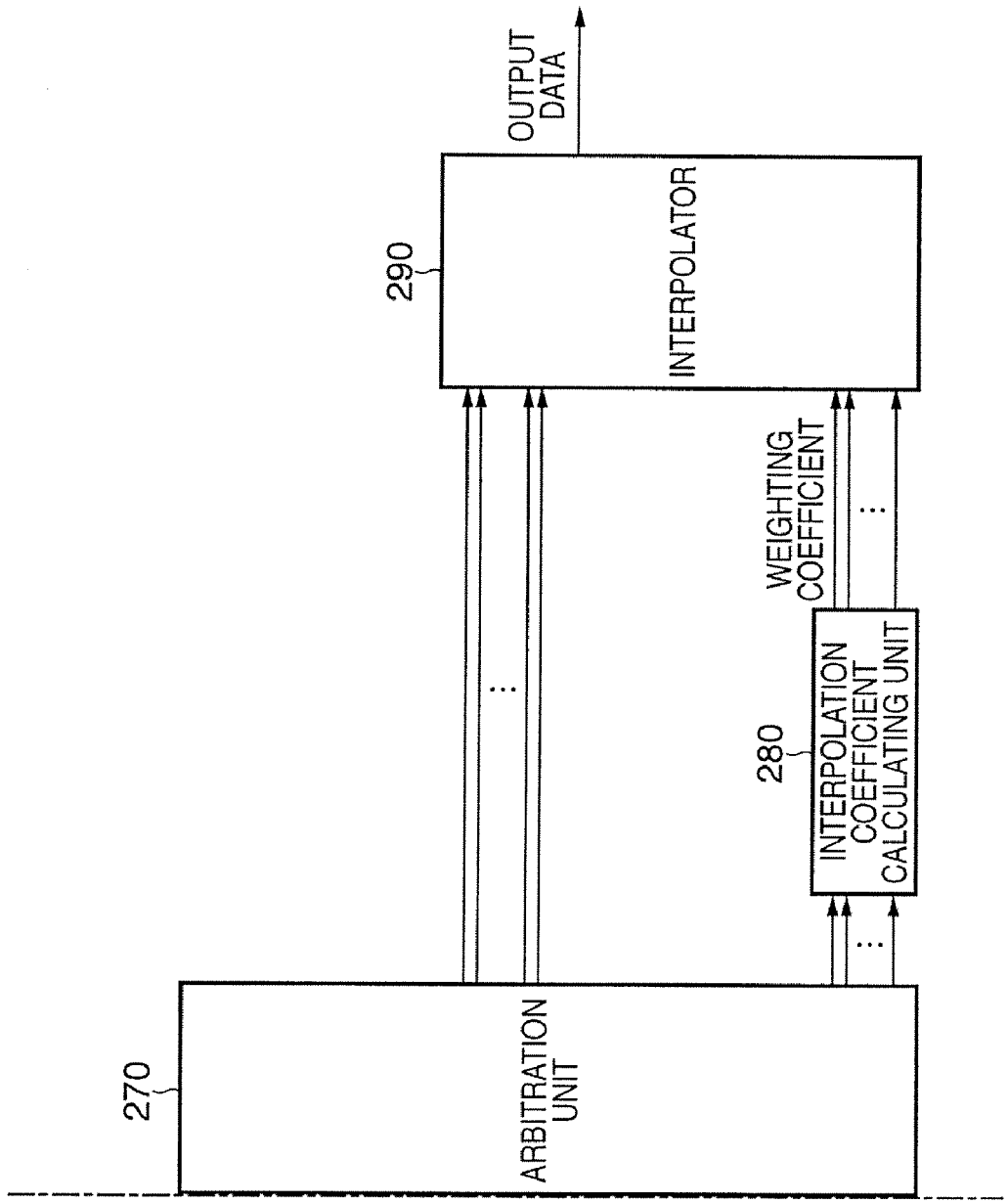

Next, the circuit configuration of the interpolating unit and the flow of processing thereof according to this embodiment will be described. FIGS. 2A and 2B are diagrams illustrating the configuration of the interpolating unit according to the first embodiment. The interpolating unit applies interpolation to an N-dimensional input signal (digital image data) and produces a new one-dimensional output signal (output data).

First, a digital image signal from the image reader 120 is input to the interpolating unit. This digital image signal is a multi-dimensional (N-dimensional) input signal.

When the digital image signal is input to a data dividing unit 210, the latter divides the digital image signal into integral data and fractional data. Since the input digital image signal is N-dimensional, both of the items of integral data and fractional data after the division of the digital image signal are N-dimensional signals. In the division processing performed by the data dividing unit 210, bit depth is decided in accordance with the number of unit supercubes used when interpolation is performed. For example, with regard to a certain dimension (axis) of N-dimensional space, in a case where there are $2^M-1$ unit supercubes, the bit depth of the integral data corresponding to this dimension (axis) is M bits. When the bit depth (M) of the integral data is subtracted from bit depth (L) of the digital image signal, the fractional data is expressed by the remainder, namely bit depth (L−M).

The N-dimensional integral data is input to a sliding dictionary generator 220. The sliding dictionary generator 220 first converts the N-dimensional integral data to information (a one-dimensional address) for reading a reference value necessary for conversion of color space out of a multidimensional LUT 246 of a DRAM 245.

The sliding dictionary generator 220 then generates the sliding dictionary 552 and code values (531 to 537), which have been described with reference to FIG. 5, with respect to the one-dimensional address after the conversion. The sliding dictionary generator 220 detects the first appearing data from the one-dimensional address and stores it in an entry area of the sliding dictionary. Each code value has the data ("beginning", "end" and "consecutive number") for associating the data contained in the one-dimensional address and the data that has been stored in each entry area of the sliding dictionary.

Data indicating in which entry area of the sliding dictionary an item of data has been stored is stored in "beginning" and "end". The number of iterations of an item of data from "beginning" to "end" is stored in "consecutive number".

The sliding dictionary generator 220 sends a reading unit 230 the sliding dictionary that has been generated based upon the one-dimensional address converted from the N-dimensional integral data. On the other hand, the sliding dictionary generator 220 stores the code values ("beginning", "end", "consecutive number") corresponding to the sliding dictionary in a buffer 225. The N-dimensional fractional data obtained by division in the data dividing unit 210 is stored in a buffer 215.

The reading unit 230 transfers addresses, which have been stored in respective ones of the entry areas of the sliding dictionary, to a DRAM controller 240 successively via a system bus 247. The DRAM controller 240 is capable of writing and reading data to and from the DRAM 245, which stores the multidimensional LUT 246 containing reference values necessary for conversion of color space. The reading unit 230 transfers addresses successively, reads reference values (referred to as a "LUT dataset" below) used in interpolation out of the multidimensional LUT 246 of DRAM 245 and stores the reference values in a buffer 260 successively.

The buffer 215 storing the N-dimensional fractional data obtained by division, the buffer 225 storing code values and the buffer 260 storing the LUT dataset are FIFO-type buffers, and the numbers or stages of the FIFO-type buffers become successively larger in the order of buffers 215, 225, 260. The number of stages of butter 260 is the same as the number entry areas of the sliding dictionary.

If the numbers of stages of the buffers 215 and 225 are satisfactory with regard to the refill latency of the image processing system, updating of data can be made the minimum necessary in local areas of image data input to the image processing system.

An arbitration unit 270 generates a control signal for reading code values out of the buffer 225 and reads code values out of the buffer 225. The arbitration unit 270 refers to the FIFO-format LUT dataset and reads the LUT dataset out of the buffer 260 in accordance with the "beginning", "end" and "consecutive number" of the code values. The arbitration unit 270 inputs the read LUT dataset to an interpolator 290.

Further, the arbitration unit 270 generates a control signal for reading the N-dimensional fractional data out of the buffer 215 and reads the N-dimensional fractional data out of the buffer 215 based upon the control signal. The arbitration unit 270 inputs the N-dimensional fractional data to an interpolation coefficient calculating unit 280. The latter converts the input N-dimensional fractional data to weighting coefficients (interpolation coefficients).

The interpolator 290 subjects the LUT dataset, which has been read out by the arbitration unit 270, to product-sum interpolation based upon the weighting coefficients (interpolation coefficients) obtained by the conversion in the interpolation coefficient calculating unit 280, and produces one-dimensional (scalar) output data.

When a storage destination in the cache memory is decided by the lower-order bits of an address, storage destinations contend between successive items of image data and the cache mechanism does not function effectively.

However, interpolation processing performed by the interpolating unit according to this embodiment is not dependent upon the address of the image data input thereto. Therefore, even in a case where items of image data for which the lower-order bits of the addresses are the same but the higher-order bits are different continue to be input alternatingly, contention between storage destinations can be avoided. This makes it possible to construct an image processing apparatus having little refill latency.

Alternatively, in accordance with this embodiment, if the numbers of buffer stages are satisfactory with respect to refill latency of the image processing system, external-memory access for refill can be reduced and refill access diminished.

(Second Embodiment)

Figure 3A:
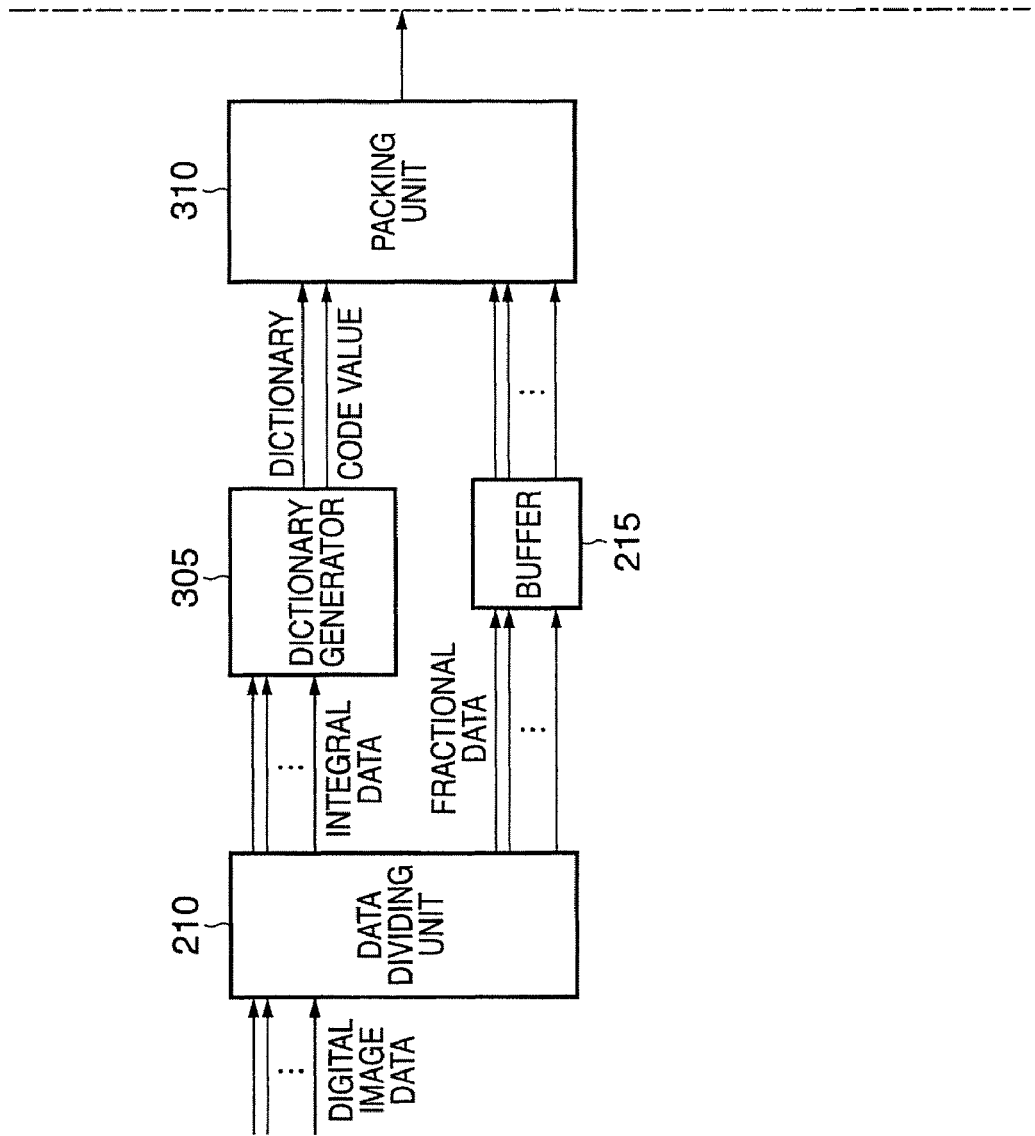
Figure 6:
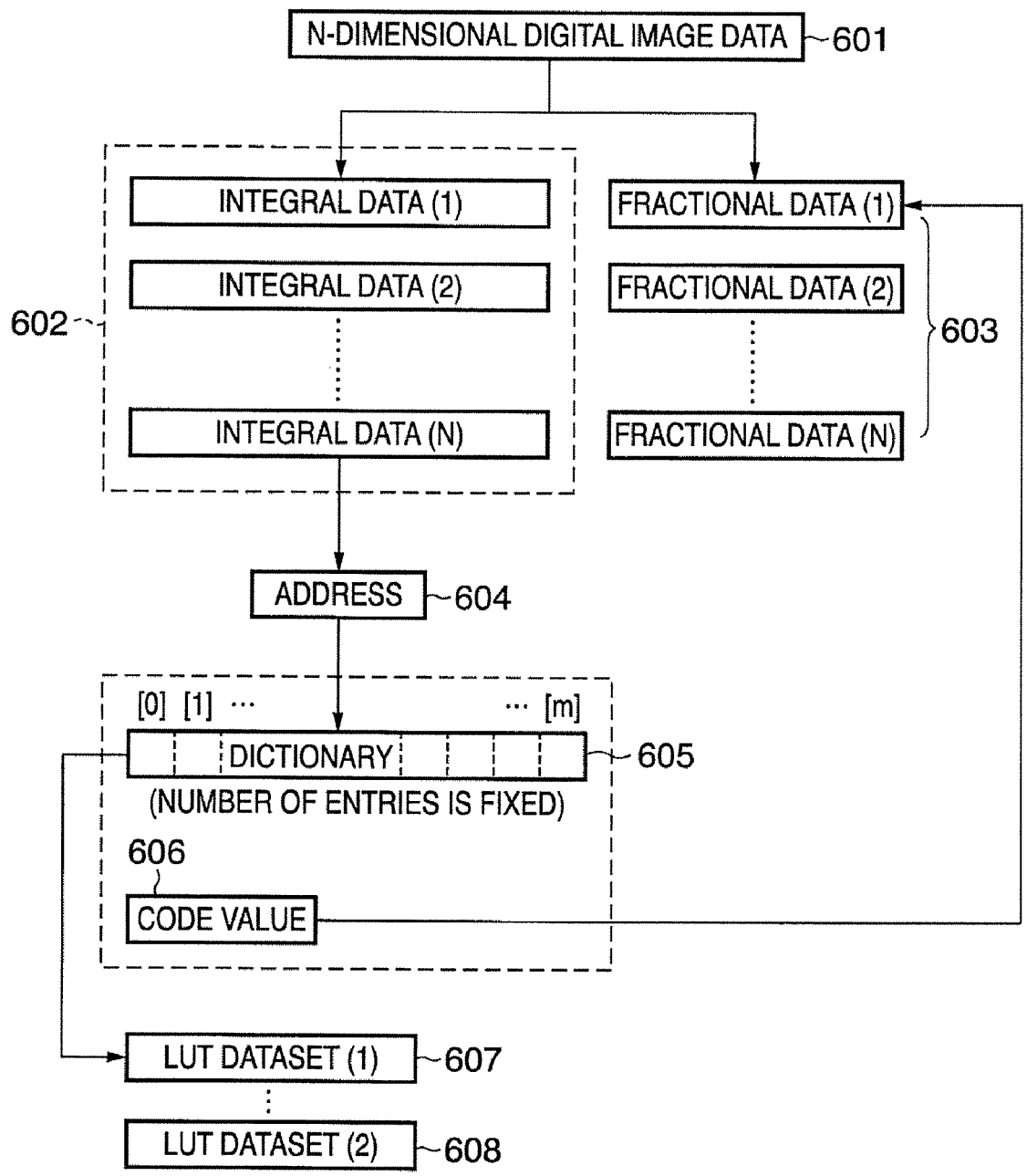
FIG. 6 is a diagram schematically illustrating the relationship of data processed by an interpolating unit.

The circuit configuration and processing flow of an interpolating unit according to a second embodiment will now be described. FIGS. 3A and 3B are diagrams illustrating the configuration of the interpolating unit according to the second embodiment. Components in FIGS. 3A and 3B similar to those constructing the circuitry of the interpolating unit according to the first embodiment shown in FIGS. 2A and 2B are designated by like reference characters and need not be described again. FIG. 6 is a diagram schematically illustrating the relationship of the data processed by the interpolating unit.

As shown in FIG. 6, an N-dimensional digital image signal 601 from the digital image reader 120 is input to the interpolating unit. In a manner similar to the first embodiments, the digital image signal is divided into integral data 602 and fractional data 603 by the data dividing unit 210. The items of integral data 602 and fractional data 603 obtained by division are N-dimensional data. The N-dimensional integral data 602 is input to a dictionary generator 305 and the N-dimensional fractional data is input to the buffer 215.

The dictionary generator 305 first converts the N-dimensional integral data 602 to information (an address) for reading a reference value necessary for conversion of color space out of the multidimensional LUT 246 of a DRAM 245.

The dictionary generator 305 then generates the dictionary 605 and code values 606 with respect to the one-dimensional address 604. That is, the dictionary generator 305 detects the first appearing data from the one-dimensional address 604 and stores the data successively in entry areas ([0], [1], . . . [m]) of the dictionary 605. The dictionary generator 305 adopts the number of stages of the internal FIFO (the number of entry areas of the dictionary) as a fixed number and halts input from the data dividing unit 210 at the stage where the FIFO becomes full.

On the basis of this halt to input, the dictionary generator 305 inputs the dictionary 605 and code values 606, which were generated until input From the data dividing unit 210 was halted, to a packing unit 310. When the dictionary 605 and code values 606 are input to the packing unit 310, the FIFO within the dictionary generator 305 becomes empty. Upon receiving input of the dictionary 605 and code values 606, the packing unit 310 reads the fractional data out of the buffer 215.

The packing unit 310 inputs the dictionary, code values and fractional data to a write unit 320 as a collection of packing data. The write unit 320 controls the DRAM controller 240 via the system bus 247 and stores the packing data in the DRAM 370.

When the FIFO of the dictionary generator 305 becomes empty, the dictionary generator 305 resumes input of the integral data 602 from the data dividing unit 210 and repeats similar processing.

A packing dataset 330 produced by writing of packing data a plurality of times is generated in the DRAM 370. The packing dataset 330 has a data structure 335 based upon a first writing operation [dictionary (1), code value (1), fractional data (1)], a second writing operation [dictionary (2), code value (2), fractional data (2)], . . . and so on.

When the dictionary (1) in the data structure 335 of the packing dataset 330 is stored in the DRAM 370, the CPU 300 converts the dictionary (1) to the corresponding LUT dataset (1) (607 in FIG. 6). Further, when the dictionary (2) is stored in the DRAM 370, the CPU 300 converts the dictionary (2) to the corresponding LUT dataset (2) (608 in FIG. 6). In the conversion of the LUT dataset (1), LUT dataset (2) . . . , the CPU 300 refers to the multidimensional LUT 246 storing the reference values necessary for the conversion of color space.

Thus, the dictionaries (1), (2), . . . of the packing dataset 330 are converted successively to the LUT datasets (1), (2), . . . . The packing dataset 330 is then converted to an interpolation dataset 340 having a data structure 345.

A read unit 350 preloads the LUT dataset (1) in a buffer 360 at the stage where the dictionary (1) was converted to the LUT dataset (1). The buffer 360 has a capacity capable of storing a number of LUT datasets that is equal to the number of entries (number of stages of the internal FIFO) of the dictionary 605 in the dictionary generator 305.

Next, the read unit 350 reads in the code value (1) and reads out the corresponding fractional data (1) successively based upon the code value (1). That is, while the number of items of fractional data (1) {specifically, a number equal to [("end"−"beginning"+1)×"consecutive number"])} decided by the code value (1) are being input to the interpolation coefficient calculating unit 280, the read unit 350 outputs the LUT dataset corresponding to "beginning" and "end" of code value (1) from the buffer 360 to the interpolator 290 repeatedly a number of times equivalent to the "consecutive number".

Processing by the read unit 350 is repeatedly executed until the data that has been stored in the interpolation dataset 340 vanishes. The read unit 350 inputs the read fractional data to the interpolation coefficient calculating unit 280, and the interpolation coefficient calculating unit 280 converts the input fractional data to weighting coefficients (interpolation coefficients).

The interpolator 290 subjects a LUT dataset, which has entered from the buffer 360, to product-sum interpolation based upon the weighting coefficients (interpolation coefficients) obtained by the conversion in the interpolation coefficient calculating unit 280, and produces one-dimensional (scalar) output data.

According to the arrangement of this embodiment, the number of entries of a dictionary (the number of stages of the internal FIFO) is dealt with as being fixed. However, the number of items of fractional data processed at one time may be made a fixed number and the dictionary may be made a sliding dictionary. In this case, data slid out of the dictionary is stored directly in a prescribed area of the packing dataset 330 in the DRAM 370 under the control of the write unit 320 without waiting for packing processing.

Interpolation processing by the interpolating unit of this embodiment is not dependent upon the address of image data input thereto. Therefore, even in a case where items of image data for which the lower-order bits of the addresses are the same but the higher-order bits are different continue to be input alternatingly, contention between storage destinations can be avoided. This makes it possible to construct an image processing apparatus having little refill latency.

Alternatively, in accordance with this embodiment, if the numbers of buffer stages are satisfactory with respect to refill latency of the image processing system, external-memory access for refill can be reduced and refill access diminished.

(Third Embodiment)

The circuit configuration and processing flow of an interpolating unit according to a third embodiment will now be described.

Figure 4A:
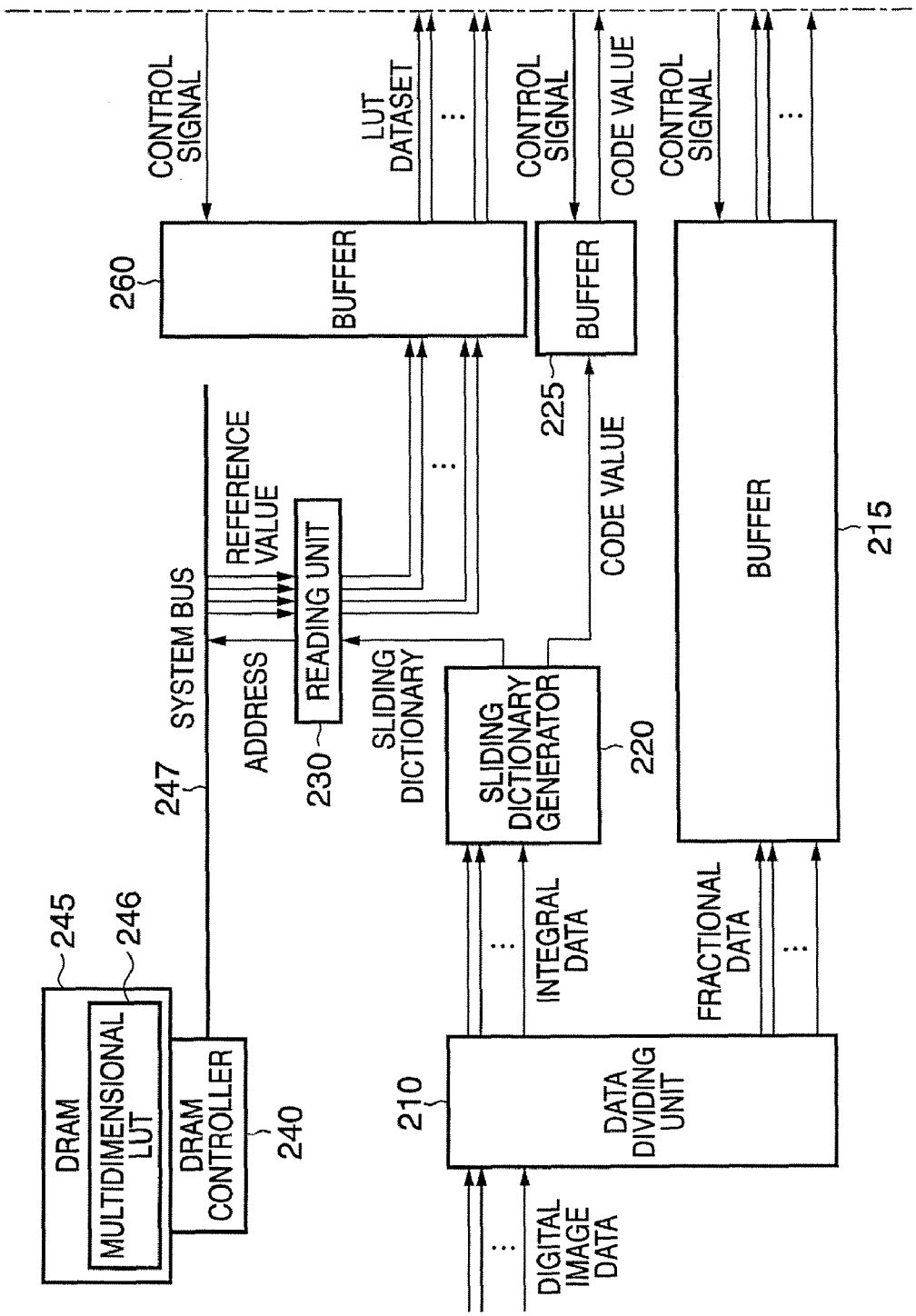
FIGS. 4A and 4B are diagrams illustrating the circuit configuration of an interpolating unit according to a third embodiment.
Figure 4B:
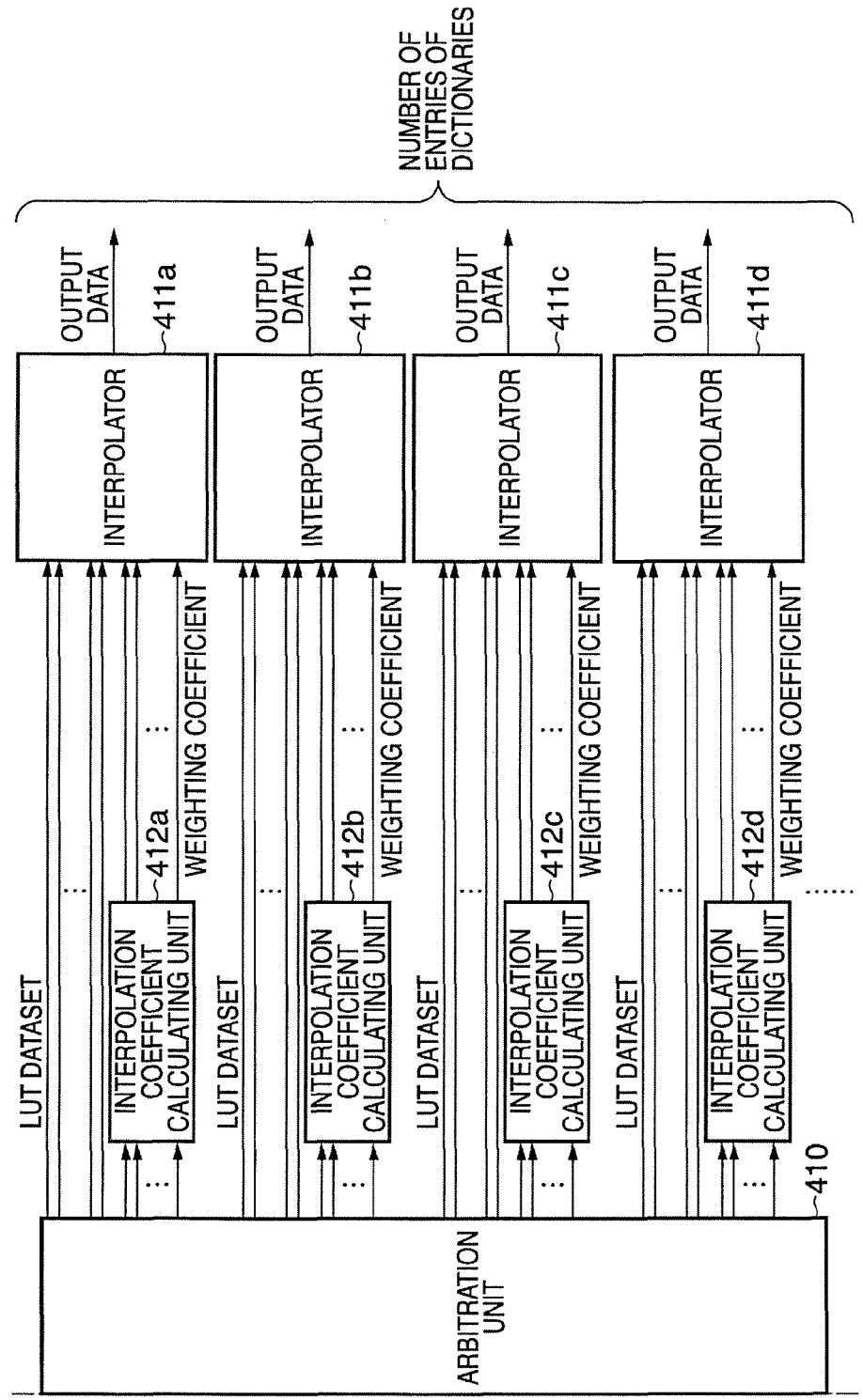

FIGS. 4A and 4B are diagrams illustrating the configuration of the interpolating unit according to the third embodiment. Components in FIGS. 4A and 4B similar to those constructing the circuitry of the interpolating unit according to the first embodiment shown in FIGS. 2A and 2B are designated by like reference characters and need not be described again.

The circuit configuration of the interpolating unit according to the third embodiment is for implementing an interpolating unit that makes it possible to place image processing circuits in parallel and process a plurality of pixels simultaneously. The interpolating unit obtains [("end"−"beginning"+1)×"consecutive number"] from the "beginning", "end" and "consecutive number" data in a code value and parallelizes the processing of interpolators corresponding to the "consecutive number".

In FIG. 5 for describing the sliding dictionary with a consecutive number, if we take the first code value (0,0,4) as an example, the "beginning" and "end" data is "0" and the "consecutive number" data is "4". In this case, [("end"−"beginning"+1)×"consecutive number"] is 1×4=4 (number of parallel operations).

The interpolating unit has an arbitration unit 410 that is capable of managing allocation of interpolators based upon the number of parallel operations. In the circuit configuration of the interpolating unit shown in FIGS. 4A and 4B, it is assumed that the number of interpolators provided is the same as the number of entries of the sliding dictionary. The arbitration unit 410 determines the number of parallel operations based upon the code value read out of the buffer 225. In a case where the number of parallel operations is four, the arbitration unit 410 allocates four interpolators and parallelizes the processing of the interpolators.

The arbitration unit 410 reads the LUT dataset corresponding to the address "A" stored in entry area [0] of the sliding dictionary 552 out of the buffer 260 and sets the LUT dataset in four interpolators (411a to 411d). The arbitration unit 410 generates a control signal for reading out four items of fractional data corresponding to the four parallel operations and reads four items of fractional data (four items of fractional data that have been stored in the FIFO format) out of the buffer 215 based upon the control signal. The arbitration unit 410 inputs these items of fractional data to interpolation coefficient calculation units (412a to 412d). The interpolation coefficient calculation units (412a to 412d) convert the input items of fractional data to weighting coefficients (interpolation coefficients).

On the basis of the LUT dataset corresponding to address "A" and the weighting coefficients obtained by conversion, the interpolators (411a to 411d) perform interpolation based upon the sum of products and produce one-dimensional (scalar) output data.

In FIG. 5 for describing the sliding dictionary, if we take the seventh code value (3,4,3) as an example, the we have [("end"−"beginning"+1)×"consecutive number"] is 2×3=6 (number of parallel operations). The arbitration unit 410 of the interpolating unit allocates size interpolators and parallelizes the processing of the interpolators.

The arbitration unit 410 reads the LUT datasets corresponding to the addresses "D" and "E" stored in entry areas [3] and [4] of the sliding dictionary 552 out of the buffer 260 and sets the LUT datasets in six interpolators. The LUT dataset corresponding to address "D" is set in the interpolators 411a, 411c, and the LUT dataset corresponding to address "E" is set in the interpolators 411b, 411d.

The arbitration unit 410 generates a control signal for reading out six items of fractional data (six items of fractional data that have been stored in the FIFO format) corresponding to the six parallel operations and reads six items of fractional data out of the buffer 215 based upon the control signal. The arbitration unit 410 inputs these items of fractional data to six interpolation coefficient calculation units. The six interpolation coefficient calculation units convert the input items of fractional data to weighting coefficients (interpolation coefficients).

On the basis of the LUT datasets corresponding to addressed "D" and "E" and the weighting coefficients obtained by conversion, the six interpolators perform interpolation based upon the sum of products and produce one-dimensional (scalar) output data.

Thus, in accordance with this embodiment, as described above, image processing circuits can be placed in parallel and a plurality of pixels can be subjected to interpolation processing simultaneously.

(Other Embodiments)

The object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes per se read from the storage medium implement the functions of the embodiments and the storage medium storing the program codes constitutes the invention.

Examples of storage media that can be used for supplying the program code are a flexible disk, hard disk, optical disk, magneto-optical disk, CD-ROM, CD-R, magnetic tape, non-volatile type memory card or ROM, etc.

Further, the functions of the above-described embodiments are implemented by having a computer execute the read program codes. The invention also includes a case where an operating system or the like running on a computer performs all or a part of the actual processing based upon the indications in the program codes and the functions of the above-described embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-272319, filed Oct. 3, 2006, which is hereby incorporated by reference herein in its entirety.

What is claimed is:

1. An image processing apparatus comprising:
a dividing unit that divides each pixel data of input image data into a higher order data string and a lower order data string;
a storage unit that stores reference values;
a generating unit that generates a sliding dictionary and a code value, which indicates correspondence among the higher order data string, the sliding dictionary and a number of consecutive iterations of data registered in the sliding dictionary, based on the higher order data string;
a converting unit that converts data registered in the sliding dictionary by referring to the reference values; and
an interpolating unit that interpolates the converted data at a weighting conforming to the lower order data string in accordance with the code value.

2. The apparatus according to claim 1, wherein the storage unit has a memory unit storing the reference values for converting the data registered in the sliding dictionary.

3. The apparatus according to claim 1, wherein the generating unit generates area data indicating an area of the sliding dictionary.

4. The apparatus according to claim 2, wherein the storage unit has a memory unit that stores the sliding dictionary, the code value, and the lower order data string.

5. The apparatus according to claim 1, wherein the interpolating unit uses interpolators, the number of which conforms to the code value, to interpolate the converted data, at a weighting conforming to the data contained in the lower order data string, the number of items of this data conforming to the code value.

6. An image output apparatus comprising the image processing apparatus set forth in claim 1, and an output unit that forms an image on a recording medium based upon an output from the interpolating unit.

7. An image processing method including a processing circuit, the method comprising:
using the processing circuit to divide each pixel data of input image data into a higher order data string and a lower order data string;
storing reference values;
generating a sliding dictionary and a code value, which indicates correspondence among the higher order data string, the sliding dictionary and the number of consecutive iterations of data registered in the sliding dictionary, based on the higher order data string;
converting the data registered in the sliding dictionary by referring to the reference values; and
interpolating the converted data at a weighting conforming to the lower order data string in accordance with the code value.

8. The method according to claim 7, wherein the generating step generates area data indicating an area of the sliding dictionary.

9. The method according to claim 7, wherein the converting step stores the sliding dictionary, the code value, and the lower order data string in a memory and converts the data registered in the sliding dictionary stored in the memory.

10. The method according to claim 7, wherein the interpolating step interpolates the converted data, at a weighting conforming to the lower order data string, the number of items of this data conforming to the code value, in a number of parallel operations conforming to the code value.

11. An image processing apparatus comprising:
a table that stores reference values for color conversion;
a generating unit that generates a pattern of data and a code value which indicates correspondence among higher order bits of each pixel data of the data string, the pattern of data, and a number of consecutive iterations of the pattern of data, based on the data string; and
a converting unit that converts the pattern of data by referring to the reference values stored in the table.

12. The apparatus according to claim 1, wherein the input image data is N dimensional image data, and the higher order data string is integral data of each pixel of the N dimensional image data, and the lower order data string is fractional data of each pixel of the N dimensional image data.

13. The apparatus according to claim 1, wherein the converting unit has a reading unit that reads the reference values corresponding to the data registered in the sliding dictionary from a memory and write the reference values to a first buffer, and
wherein the interpolating unit interpolates the data based on the lower order data string stored in a second buffer, the code value stored in a third buffer, and the reference values stored in the first buffer.

14. The apparatus according to claim 1, wherein the code value includes a first index based on the sliding dictionary, a second index based on the sliding dictionary, and the number of consecutive iterations of a set of characters, the set of characters being a string starting from the first index and ending at the second index.

15. The method according to claim 7, wherein the code value includes a first index based on the sliding dictionary, a second index based on the sliding dictionary, and the number of consecutive iterations of a set of characters, the set of characters being a string starting from the first index and ending at the second index.

* * * * *